US010223302B2

(12) United States Patent
Farrow et al.

(10) Patent No.: US 10,223,302 B2
(45) Date of Patent: *Mar. 5, 2019

(54) SYSTEMS AND METHODS FOR IMPLEMENTING A USER MODE VIRTUAL SERIAL COMMUNICATIONS PORT EMULATOR

(71) Applicant: Toshiba Global Commerce Solutions Holdings Corporation, Tokyo (JP)

(72) Inventors: Glynn Farrow, Singapore (SG); Weifeng Ge, Singapore (SG); Mui Ling Tay, Singapore (SG); Guek Wu Neo, Singapore (SG)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,023

(22) Filed: Nov. 9, 2017

(65) Prior Publication Data

US 2018/0067879 A1 Mar. 8, 2018

Related U.S. Application Data

(63) Continuation of application No. 14/670,481, filed on Mar. 27, 2015, now Pat. No. 9,842,072.

(51) Int. Cl.
*G06F 13/00* (2006.01)
*G06F 13/38* (2006.01)
(Continued)

(52) U.S. Cl.
CPC ........ *G06F 13/1673* (2013.01); *G06F 13/105* (2013.01); *G06F 13/387* (2013.01);
(Continued)

(58) Field of Classification Search
CPC ........... G06F 13/00; G06F 13/38; G06F 13/36
See application file for complete search history.

(56) References Cited

U.S. PATENT DOCUMENTS 5,787,305 A 7/1998 Chen
6,230,118 B1 5/2001 Bader et al.
(Continued)

FOREIGN PATENT DOCUMENTS

EP 1059585 A2 12/2000

OTHER PUBLICATIONS

John Wiseman, G8BPQ User Mode Virtual Serial Port Driver, Nov. 2011 (two (2) pages).
(Continued)

*Primary Examiner* — David E Martinez
(74) *Attorney, Agent, or Firm* — Olive Law Group, PLLC

(57) ABSTRACT

Systems and methods for implementing a user mode virtual serial communications port emulator are disclosed herein. According to an aspect, a method for a virtual serial communications port emulator includes using at least one processor and memory for creating a virtual serial communication port (VCP) driver in a user mode of an operating system. The method further includes emulating a physical serial communication port using the VCP driver. In addition, the method includes converting outgoing data from an application executed on the at least one processor and memory via the VCP driver into a format complying with a protocol associated with a VCP device server. The method also includes converting incoming data from the VCP device server complying with the protocol into a second format understood by the application, wherein the VCP driver is communicated with using an unpublished universally unique identifier (UUID).

17 Claims, 2 Drawing Sheets

(51) Int. Cl.
    *G06F 13/36* (2006.01)
    *G06F 13/16* (2006.01)
    *G06F 13/42* (2006.01)
    *G06F 13/10* (2006.01)

(52) U.S. Cl.
    CPC .. *G06F 13/4282* (2013.01); *G06F 2213/0002* (2013.01); *G06F 2213/3852* (2013.01)

(56) References Cited

U.S. PATENT DOCUMENTS

| | | | |
|---|---|---|---|
| 6,263,384 B1 | 7/2001 | Yanase | |
| 6,272,452 B1 | 8/2001 | Wu et al. | |
| 6,760,804 B1 | 7/2004 | Hunt et al. | |
| 7,043,205 B1 | 5/2006 | Caddes et al. | |
| 7,392,172 B2 | 6/2008 | Rostampour | |
| 7,424,419 B1 | 9/2008 | Fike et al. | |
| 7,509,436 B1 * | 3/2009 | Rissmeyer | G06F 13/102 709/249 |
| 7,570,917 B2 | 8/2009 | Lee | |
| 7,761,621 B2 | 7/2010 | Hutchison et al. | |
| 8,069,226 B2 | 11/2011 | Momchilov et al. | |
| 8,150,973 B2 | 4/2012 | Diamant | |
| 8,510,489 B2 | 8/2013 | Peng et al. | |
| 8,521,929 B2 | 8/2013 | Dai | |
| 8,650,273 B2 | 2/2014 | Lambert et al. | |
| 2005/0086041 A1 | 4/2005 | Chrysanthakopoulos | |
| 2006/0245533 A1 | 11/2006 | Rostampour | |
| 2007/0129860 A1 | 6/2007 | Voeller | |
| 2007/0203686 A1 | 8/2007 | Haley et al. | |
| 2008/0126072 A1 | 5/2008 | Hutchison et al. | |
| 2008/0201501 A1 | 8/2008 | Partani et al. | |
| 2012/0198440 A1 | 8/2012 | Shah | |
| 2015/0268970 A1 | 9/2015 | Mudusuru et al. | |

OTHER PUBLICATIONS

Non-Final Office Action issued in counterpart U.S. Appl. No. 14/670,481 dated Apr. 13, 2017 (ten (10) pages).

Notice of Allowance issued in counterpart U.S. Appl. No. 14/670,481 dated Oct. 25, 2017 (seventeen (17) pages).

Silicon Laboratories, Implementing USB Communication Device Class (CDC) on SiM3U1XX MCUS, 2013 (thirty (30) pages).

Stoilov, Anton. A New Approach to Embedded Applications Based on PIC Microcontrollers use USB Interface to Communicate with PC. vol. 5, 2007 (seven (7) pages).

VARbusiness. Adding Virtual Serial Ports, Apr. 1994: 28 (three (3) pages).

* cited by examiner

SYSTEMS AND METHODS FOR IMPLEMENTING A USER MODE VIRTUAL SERIAL COMMUNICATIONS PORT EMULATOR

CROSS REFERENCE TO RELATED APPLICATION

This is a continuation application of U.S. patent application Ser. No. 14/670,481, filed on Mar. 27, 2015, and titled SYSTEMS AND METHODS FOR IMPLEMENTING A USER MODE VIRTUAL SERIAL COMMUNICATIONS PORT EMULATOR, the disclosure of which is incorporated herein by reference in its entirety.

TECHNICAL FIELD

The present disclosure relates to emulators. More specifically, the present disclosure relates to systems and methods for implementing a user mode virtual serial communications port emulator.

BACKGROUND

In computing, a serial communication physical interface is often referred to as a serial port through which information transfers in or out one bit at a time (in contrast to a parallel port with multiple bits in parallel). Throughout most of the history of computers, data has been transferred through serial ports to devices such as modems, terminals, and various peripherals. The term "serial port" has historically identified hardware more or less compliant to the RS-232 standard, intended to interface with a modem or with a similar communication device. However, interfaces such as Ethernet, FireWire, and universal serial bus (USB) all send data as a serial stream as well. Serial ports are still used in applications such as industrial automation systems, scientific instruments, point of service (POS) systems and some industrial and consumer products. Server computers may use a serial port as a control console for diagnostics. Network equipment (such as routers and switches) often use a serial console for configuration. Serial ports are still used in these areas as they are simple, low cost, and their console functions are highly standardized and widespread. A serial port requires very little supporting software from the host system. A serial communications (COM) port is a driver interfacing with a universal asynchronous receiver and transmitter (UART) and provides certain interface semantics for reading, writing, flow control, and timing.

A virtual serial port is an emulation of the standard serial port. This port is created by software which enables extra serial ports in an operating system (OS) without additional hardware installation (such as expansion cards or the like). It is possible to create a large number of virtual serial ports in a computing device. The only limitation is the amount of resources, such as operating memory and computing power, needed to emulate many serial ports at the same time. Virtual serial ports emulate all hardware serial port functionality, including baud rate, data bits, parity bits, stop bits, and the like. Additionally, serial ports allow controlling the data flow, emulating all signal lines (DTR/DSR/CTS/RTS/DCD/RI) and customizing pinouts. Virtual serial ports are common with Bluetooth™ and are the standard way of receiving data from BLUETOOTH™-equipped global positioning system (GPS) modules.

Virtual serial communications (COM) port emulation can be useful in the scenario there is a lack of available physical serial ports or they do not meet the current requirements. For instance, virtual serial ports can share data between several applications from one GPS device connected to a serial port. Another option is to communicate with any other serial devices via internet or local area network (LAN) as if they are locally connected to computer (Serial over LAN/Serial-over-Ethernet technology). Two computers or applications can communicate through an emulated serial port link. Virtual serial port emulators are available for many operating systems including MACOS™, LINUX™, and various mobile and desktop versions of MICROSOFT WINDOWS™ operating systems.

In many modern operating systems, software programs, applications or processes can execute in user mode or kernel mode. In kernel mode, a program can interact with the OS directly and may cause certain events (e.g., timers, keyboard, hard disk I/O, or the like), and these events are called interrupts. When an interrupt occurs, the central processing unit (CPU) essentially stops executing the currently running program, and switches to kernel mode, executing the interrupt handler for that event. The handler saves the state of the CPU performs some processing relevant to that event, and restores the state of the CPU (possibly switching back to user mode) so the CPU can resume execution of the program. As a result of operating in kernel mode the computer system may be error prone and subject to context switching which negatively impacts performance. In user mode, however, programs cannot modify paging directly and so have no way of accessing other program's memory except through an application programming interface (API) function. Programs in user mode also cannot interfere with interrupts and context switching of other programs. Typical virtual serial COM port emulators interface and execute by communicating with the OS via an API in kernel mode. Operating in kernel mode exposes the computer system to be more vulnerable to bugs, errors and slower performing in general. For at least these reasons, there is a need for improved systems and methods for implementing a user mode virtual serial communications port emulator.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1:
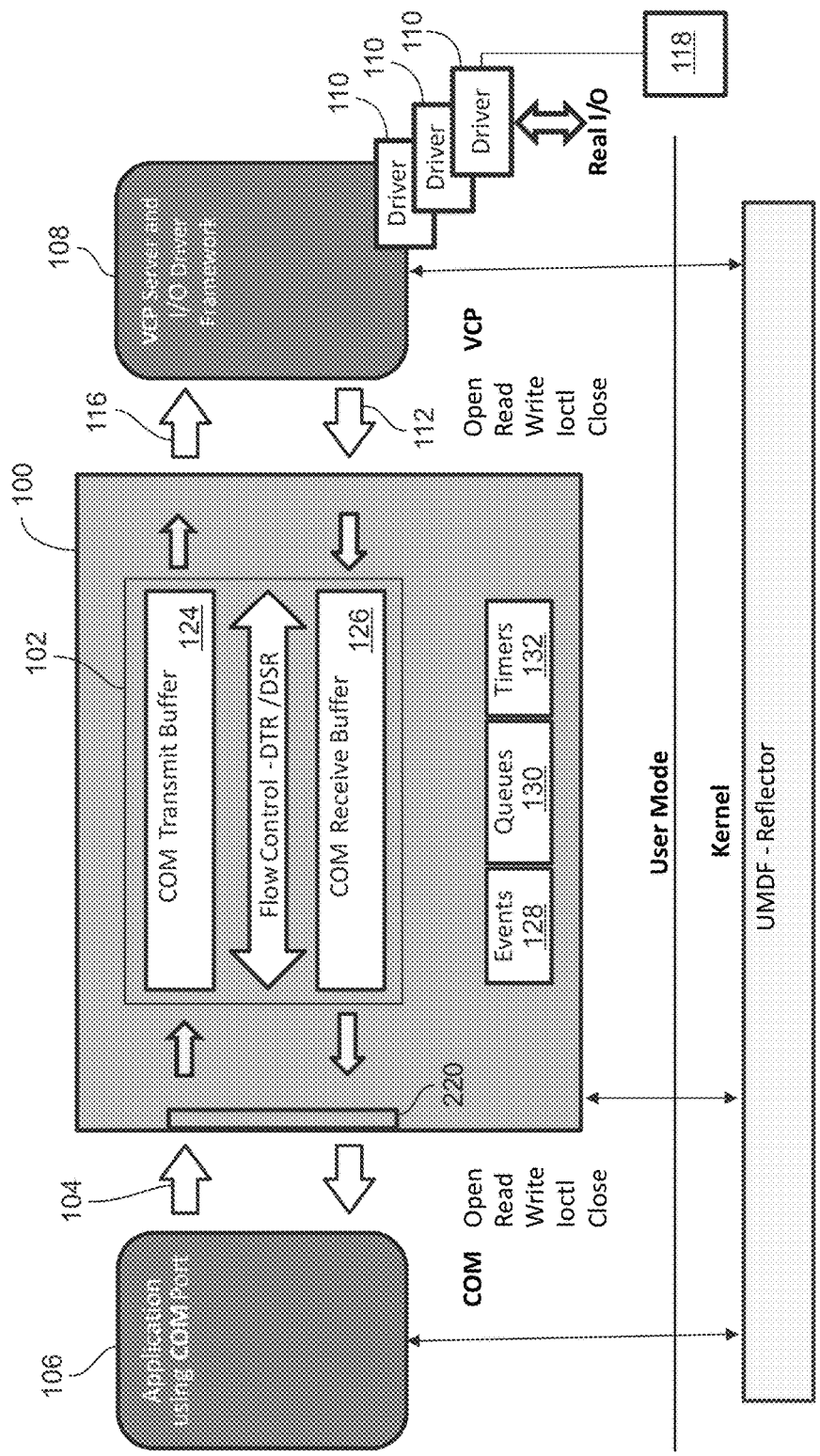
FIG. 1 is a block diagram of an example user mode virtual serial communications port emulator including data flow and emulator services according to embodiments of the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be, for example, retail equipment such as POS equipment. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. A computing device can also include any type of conventional computer, for example, a laptop computer or a tablet computer. Although many of the examples provided herein are implemented on smart phone, the examples may similarly be implemented on any suitable computing device, such as a computer.

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

FIG. 1 illustrates a block diagram of an example user mode virtual serial communications port (VCP) emulator 100 that shows a serial device driver interfacing with a virtual serial communications port emulator according to embodiments of the present disclosure. The block diagram is an illustration showing the VCP emulator 100 that includes a VCP driver 102 created or executed in a user mode of an operating system (e.g., MICROSOFT WINDOWS™ OS, LINUX™ OS, etc.). As an example, the VCP driver 102 may be opened as a COM port (e.g., COM1, COM2, etc.) by a suitable application, such as a Point of Service (POS) application and opened as a VCP driver 102 by server software that provides emulation, protocol translation, and other services. As an example, the VCP driver 102 may emulate a physical serial communication port. The application may be implemented by hardware, software, firmware, or combinations thereof. For example, the application may be implemented by one or more processors running instructions residing in memory.

The VCP driver 102 is configured to convert outgoing data 104 from an application 106 implemented on a computing device into a format complying with a protocol associated with a VCP device server 108 and/or a device driver 110. The VCP driver 102 may be configured to convert incoming data 112 from the VCP device server 108 complying with the protocol into a format understood by the application 106. The VCP driver 102 may be communicated with by the VCP device server 108 using an unpublished universally unique identifier (UUID) 114.

As an example, the application 106 may be a point-of-service (POS) application configured to communicate with a serial COM Port for transmitting data to a serial device such as a serial cash drawer (not shown). The outbound device commands 116 may be transmitted to the VCP driver server 108 and onward to a device driver 110. The device drive 110 can manage and drive a real USB cash drawer 118. Protocol conversion may be desired as the serial cash drawer may only require a single byte command, while the USB cash drawer may require an eight (8) byte command to open. In this manner, the application 106 may send a serial "Open" command 104, the command 104 may be converted to the USB "Open" command 116, and may subsequently be sent to the real USB cash drawer 118. As a result of the USB "Open" command 116 the USB cash drawer 118 may open. Likewise, USB cash drawer status information from the USB cash drawer 118 may be communicated back through the VCP driver server 108, and subsequently to the application 106 via the VCP driver 102 via incoming data 112 from the VCP device server 108. In this example, the application 106 may be a legacy application (e.g., an older application that predated USB cash drawers) and may only be configured to communicate with a serial cash drawer, because access to the original source code for the application 106 is not available or upgrading the application 106 may not be feasible for cost or technical reasons. In other embodiments, the VCP emulator 100 may be utilized to completely emulate a device in software as part of new device development or as part of an early sales demonstration of an unimplemented product.

It is noted that an operating system may have several modes of operation. One mode may be a kernel mode in which the executing code has complete and unrestricted access to the underlying processor, memory and computing hardware. The executing code can execute any CPU instruction and reference any memory address. Kernel mode is generally reserved for the lowest-level, most trusted functions of the operating system. Crashes in kernel mode may be catastrophic and may cause the computing device 102 to stop or crash. Another mode of operation is a user mode. In user mode, the executing code may not have the ability to directly access the processor, memory and/or computing hardware. Code executing in user mode must delegate to system APIs to access the processor, memory and/or computing hardware. Because of the protection afforded by this sort of isolation of executing code, computing hardware crashes in user mode may be recoverable.

As an example, a processor in a computing device running MICROSOFT WINDOWS™ OS may have two different modes: user mode and kernel mode. The processor may switch between the two modes depending on what type of code is executing on the processor. Applications may execute in user mode. The core operating system components may execute in kernel mode. Some drivers may execute in kernel mode, and other drivers may execute in user mode. When a user mode application is executed or initiated, the MICROSOFT WINDOWS™ OS creates a process for the application. The process provides the application with a private virtual address space and a private handle table. Because an application's virtual address space may be private, one application may not alter data that belongs to another application. Each application executes in isolation, and if an application crashes, the crash may be limited to that one application. In this case, other applications and the operating system are not affected by the crash. In addition to being private, the virtual address space of the user mode application is limited. A processor executing the application in user mode cannot access virtual addresses that are reserved for the operating system. Limiting the virtual address space of the user mode application may prevent the application from altering, and possibly damaging, critical operating system data. Code executed in kernel mode may share a single virtual address space. Thus, a kernel-mode driver is not isolated from other drivers and the operating system itself. If a kernel mode driver accidentally writes to the wrong virtual address, data that belongs to the operating system or another driver could be compromised. If a kernel mode driver crashes, the entire operating system may crash.

With continuing reference to FIG. 1, the UUID 114 is an identifier that can be used in software construction. Depending on the operating system, the UUID 114 may be a 128-bit sized value or another suitable type of value. The meaning of each bit is defined by any of several variants based on the OS, application, or driver. As an example, a human-readable display (not shown), may use a canonical format using hexadecimal text with inserted hyphen characters. For example, the UUID 114 may be represented as "de305d54-75b4-431b-adb2-eb6b9e546013". The intent of UUIDs is to enable distributed systems to uniquely identify information without significant central coordination. In this context, the word unique can be taken to mean "practically unique" rather than "guaranteed unique". Since the identifiers have a finite size, it is possible for two differing items to share the same identifier. This may be a form of hash collision. The identifier size and generation process may be selected so as to make this sufficiently improbable in practice. An application 106 may create the UUID 114 and use it to identify the VCP driver 102 with reasonable confidence that the same identifier is not unintentionally created by the same application 106 or another application to identify another VCP driver 102 or other computing resource. The VCP emulator 100 may be implemented using MICROSOFT USER MODE FRAMEWORK DRIVER™. Other technologies may be MICROSOFT VISUAL STUDIO™ 10 and MICROSOFT WINDOWS™ Driver Kit. In this manner, as an example, the VCP driver 102 may execute completely in user mode, thus the VCP driver 102 may not require direct calls, interrupts or communication in kernel mode, using instead MICROSOFT USER MODE FRAMEWORK DRIVER™ to interface and communicate with the operating system kernel.

The VCP driver 102 may be opened both as a COM port 120 and as a VCP Driver port 122 and, in this manner, be considered "linked" or "connected" in a similar manner as a real COM Port using symbolic links (e.g., COM1, COM2, etc.) is linked to a real serial device (e.g., MODEM, etc.) via a UART and cable. The byte stream transmitted to the COM port 120 by Writing to the COM interface of the device may be received by the VCP device server 108 at the VCP Driver port 122. The byte stream transmitted back to the VCP Driver 102 from the VCP device server 108, may be transmitted via a VCP driver port 122, and subsequently transmitted to the COM Port 120 and read by the application 106. The transmission path between the application 106 and the VCP device server 108 may be a pair of user mode memory buffers, a transmit buffer 124 and a receive buffer 126. Transmission via the transmit buffer 124 and the receive buffer 126 may use user mode memory buffers. Using user mode memory buffers may be referred to as tightly coupling the application 106 and the VCP device server 108 and/or the driver 110 and device 118. A tightly coupled application 106 and VCP device server 108 may result in extremely fast transmission speeds or transmission speeds considerably higher performing than an application that executes in kernel mode whether in full or in part.

With continued reference to FIG. 1, other implementations using real devices may or may not restrict emulation to real line speeds (baud rates). Although the VCP driver 102 may be configured to emulate real world transmission speeds if desired. As an example, the complex COM port behaviors or semantics may be consistent with real COM Port drivers, such as Microsoft's serial.sys COM port driver. Thus, flow control and device handshaking (e.g., data terminal ready "DTR, data set ready "DSR", ready to send "RTS", clear to send "CLS", etc.) may be implemented as desired to fully emulate the Microsoft's™ serial.sys COM port driver.

The VCP emulator 100 may also include an interrupt or event handler 128. As an example, the event handler 128 may be configured with a callback routine that handles inputs received from the VCP driver 102 or VCP emulator 100. Additionally, the VCP emulator 100 may include a queue 130 configured for providing messaging using an asynchronous communications protocol. In this manner, a sender and a receiver may not be required to message or interact at the same time or directly to each other. Messages placed onto the queue 130 are stored until the recipient retrieves them. The VCP emulator 100 may be configured to send and/or receive messages via the queue 130 to either the application 106 or the VCP device server 108. The queue 130 may be configured such that the number of messages that may remain outstanding in the queue 130 may be of any size. Further, the VCP emulator 100 may be configured with a timer 132. The timer 132 may be used to trigger the VCP driver 102 to poll the VCP driver 102 or any communicating programs. Additionally, the timer 132 may be used to provide flow control for data transmission via the transmit buffer 124 and the receive buffer 126, flow control may be configured to substantially emulate a real physical device in speed.

Figure 2:
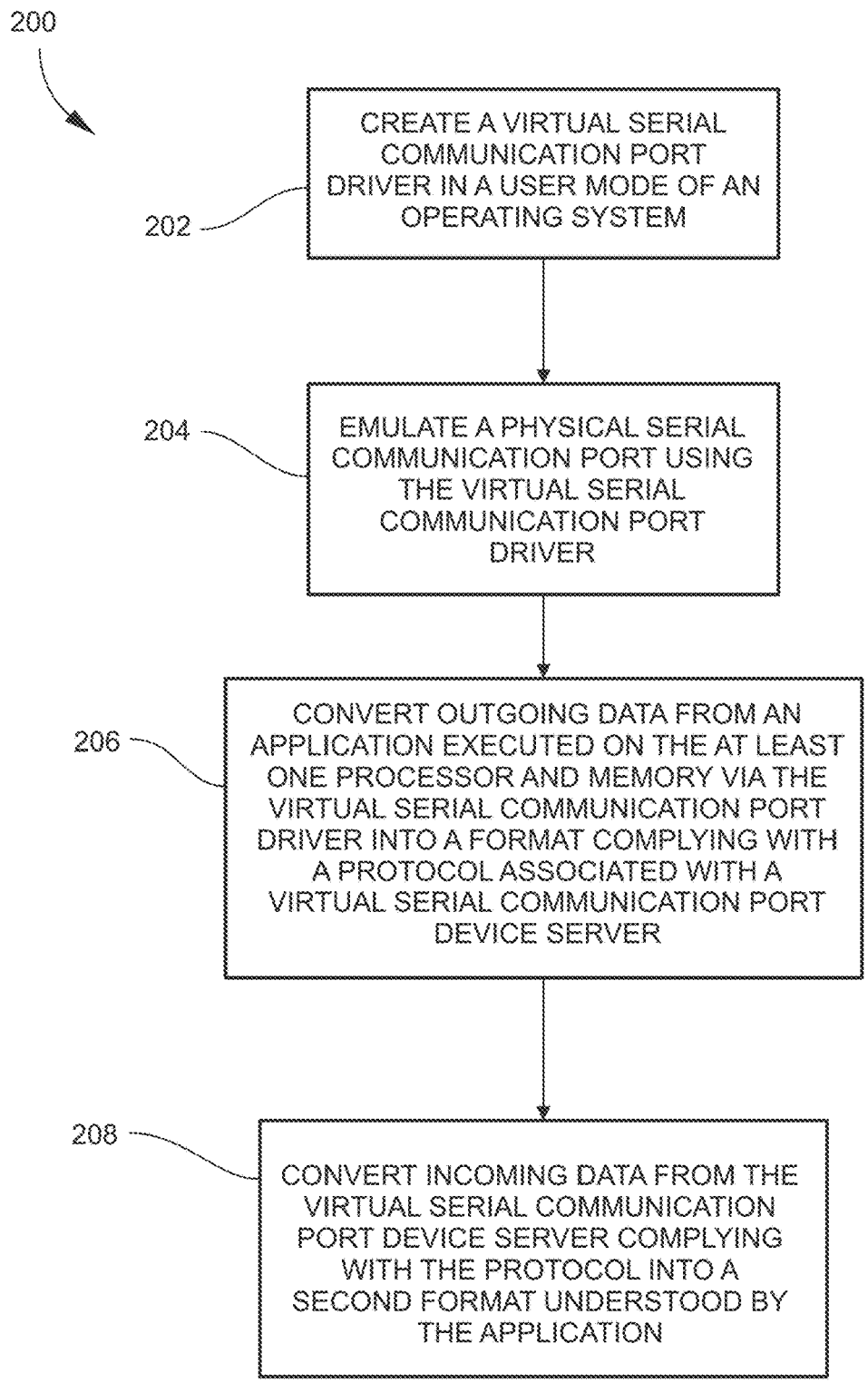
FIG. 2 is a flowchart of an example method for implementing a user mode virtual serial communications port emulator according to embodiments of the present disclosure.

FIG. 2 illustrates a flow chart of an example method 200 for implementing a user mode VCP emulator 200 according to embodiments of the present disclosure. This method is described by example as being implemented by the emulator shown in FIG. 1, although it should be understood that the method may alternatively be implemented by any suitable emulator or computing device.

Referring to FIG. 2, the method 200 includes creating 202 a VCP driver in a user mode of an operating system. As an example, the user mode VCP emulator 100 of FIG. 2 shows the VCP driver 102 interfacing with the application 106 and the VCP device server 108 according to embodiments of the present disclosure. The VCP emulator 100 includes the VCP driver 102 created or executed in a user mode of an operating system (e.g., MICROSOFT WINDOWS™ OS, LINUX™ OS, ANDROID™ OS, and the like). As an example, the VCP driver 102 may be opened as a COM Port (e.g., COM1, COM2, etc.) by an application, such as a Point of Service (POS) Application and opened as a VCP driver 202 by server software that provides emulation, protocol translation and other services.

With continued reference to FIG. 2, the method 200 includes emulating 204 a physical serial communication port using the VCP driver 102. It is noted that other interfaces may be emulated. For example, other physical communication ports, such as parallel, USB ports may be emulated as desired. In these examples the virtual serial communication port device may more appropriately be referred to as a virtual parallel communication port, virtual USB communication port, or the like.

The method 200 of FIG. 2 includes converting 206 outgoing data from the application 106 executed on the at least one processor and memory via the VCP driver into a format complying with a protocol associated with the VCP device server 108 and/or associated device driver 110. The method 200 may also include converting 208 incoming data 112 from the VCP device server 108 complying with the protocol into the format understood by the application 106. The VCP driver 102 may be communicated with by the VCP device server 108 using a UUID 114.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for a virtual serial communications port emulator, the method comprising:
using at least one processor and memory for:
creating a virtual serial communication port driver in a user mode of an operating system;
emulating, in the user mode of the operating system, at least one physical serial communication ports using the virtual serial communication port driver;
using a timer to trigger the at least one physical serial communication ports to poll the virtual serial communication port driver;
converting outgoing data from an application executed on the at least one processor and memory via the virtual serial communication port driver into a format complying with a protocol associated with a virtual serial communication port device server;
interfacing, by the virtual serial communication port driver, with the application and the virtual serial communication port device server in the user mode of the operating system; and
converting incoming data from the virtual serial communication port device server complying with the protocol into a second format understood by the application, wherein the virtual serial communication port driver is communicated with by the virtual serial communication port device server using an unpublished universally unique identifier (UUID).

2. The method of claim 1, further comprising opening the virtual serial communication port driver as a communications port by the application.

3. The method of claim 2, further comprising communicating with virtual serial communication port driver as communications port via symbolic link.

4. The method of claim 1, further comprising opening the virtual serial communication port driver as virtual serial communication port device by the virtual serial communication port device server.

5. The method of claim 4, further comprising providing, via the virtual serial communication port device server, emulation and protocol translation services for the virtual serial communication port driver.

6. The method of claim 1, wherein the virtual communications port driver is configured to use user mode memory buffers.

7. The method of claim 6, wherein the virtual communications port driver is further configured to use a first user mode memory buffer for the outgoing data and a second user mode memory buffer for the incoming data.

8. The method of claim 1, wherein the virtual communications port driver is further configured to emulate serial.sys communication port driver.

9. The method of claim 1, wherein the virtual serial communications port driver uses a user mode driver framework (UMDF).

10. A system for a virtual serial communications port emulator, the system comprising:
- at least one processor and memory;
- a plurality of virtual serial communication port drivers created in a user mode of an operating system;
- an emulator configured to emulate, in the user mode of the operating system, a physical serial communication port using the virtual serial communication driver;
- a timer configured to trigger the at least one physical serial communication ports to poll the virtual serial communication port driver; and
- at least one physical serial communication port emulated using the plurality of virtual serial communication port drivers, wherein the plurality of virtual serial communication port drivers:
- convert outgoing data from an application located on the at least one processor and memory via the multiple virtual serial communication port drivers into a format complying with a protocol associated with a virtual serial communication port device server;
- interfacing, by the virtual serial communication port driver, with the application and the virtual serial communication port device server in the user mode of the operating system; and
- convert incoming data from the virtual serial communication port device server complying with the protocol into a second format understood by the application, wherein the multiple virtual serial communication port driver is communicated with by the virtual serial communication port device server using an unpublished universally unique identifier (UUID).

11. The system of claim 10, wherein the virtual serial communication port drivers are configured to be opened as a communications port by the application.

12. The system of claim 11, wherein the virtual serial communications port emulator is configured to be communicated with the multiple virtual serial communication port driver as communications port via symbolic link.

13. The system of claim 10, wherein the plurality of virtual serial communication port drivers are configured to be opened as virtual serial communication port device by the virtual serial communication port device server.

14. The system of claim 13, wherein the virtual serial communication port device server is configured to provide emulation and protocol translation services for the multiple virtual serial communication port driver.

15. The system of claim 10, wherein the plurality of virtual serial communication port drivers are configured to use user mode memory buffers.

16. The system of claim 15, wherein the plurality of virtual serial communication port drivers are further configured to use a first user mode memory buffer for the outgoing data and a second user mode memory buffer for the incoming data.

17. The system of claim 10, wherein the virtual communications port drivers are further configured to emulate a serial.sys communications port driver.

* * * * *